3,214,485
METHOD FOR THE ISOMERIZATION OF
METHYL BENZENES
Emmett H. Burk, Jr., Hazel Crest, Robert H. Jordan, Chicago Heights, and Owen H. Thomas, South Holland, Ill., assignors to Sinclair Research, Inc., Wilmington, Del., a corporation of Delaware
No Drawing. Filed June 21, 1962, Ser. No. 204,078
5 Claims. (Cl. 260—668)

This invention relates to an improvement in the catalytic isomerization of methyl benzenes and in one particular aspect to the isomerization of dimethylbenzenes such as xylene, in a moving catalyst bed reactor system using a silica-based catalyst having a selected activity index.

The isomerization of any given alkylated aromatic hydrocarbon for instance, xylene, or mixtures thereof, to other isomeric forms is a reaction well known in the art as described for example in U.S. Patents 2,403,757 to Reeves or 2,564,388 to Bennett et al. which typify fixed catalyst bed reaction systems. Certain disadvantages, however, are associated with such systems, such as, for instance, excessive formation of coke on the catalyst which necessitates frequent periodic catalyst regeneration procedures to increase the ultimate recovery of xylenes. During these regenerations the hydrocarbon feedstock is not processed and valuable on-stream time is lost.

It has now been found that a significant improvement in the isomerization of methyl benzenes can be achieved in a catalytic moving bed charged with a methylated benzene feedstock having a total average carbon atom content of about 8–10, especially $C_8$ and $C_9$ methyl benzenes. These charge stocks contain other than equilibrium amounts at least one isomer which may even be more of such isomer. Thus the feedstock is lean in the desired product. A feedstock found suitable for the practice of this invention is one which may be described as an ethylbenzene lean meta-xylene concentrate. Such a feedstock may contain, for instance, about 55–85% meta-xylene, 0 to about 15% ethyl benzene, 0 to about 25% ortho-xylene, the balance being substantially para-xylene. The individual xylenes alone may also be used. Other feedstocks which are suitable for use in this invention to produce products other than, for instance, paraxylene, comprise, for example, pseudocume to yield mesitylene. Similarly other $C_8$, $C_9$, and $C_{10}$ methylated benzenes can be employed to produce their isomeric forms. Preferably the feed is composed predominantly or even substantially entirely of components of the same number of carbon atoms.

In the moving bed procedure, catalyst is moved as a compact mass in essentially a single direction such as from a catalyst inlet to an outlet, through a hydrocarbon conversion zone, and is usually circulated as a compact moving mass through successive stages of hydrocarbon conversion and catalyst regeneration. Between the conversion and regeneration zones the catalyst may or may not be transported as a compact mass. The moving bed can be moving in any direction, for instance, upwardly or it can gravitate downwardly through a hydrocarbon conversion zone, either concurrently or countercurrently with the hydrocarbon material and with a minimum of backmixing between the hydrocarbon material and the catalyst. The hydrocarbon material essentially moves in one direction from feed inlet to product outlet. The moving bed procedure can be distinguished from a fluidized bed employing powdery catalytic material which does not move through a conversion zone as a compact mass and involves a considerable degree of backmixing between the catalyst and hydrocarbon material in the conversion zone thereby lowering the rate of reaction and isomerization selectivity. In the moving bed macro-size catalyst is used, for instance having a diameter of about $\frac{1}{16}$ to $\frac{3}{8}''$.

The isomerization catalyst used in this moving bed system has a selected activity index of about 25–35, preferably 25–30 to increase the selective isomerization of, for instance, the meta-xylene concentrate to paraxylene. One conventional cracking activity of a catalyst is generally expressed in terms of the percent by volume of a standard hydrocarbon charge which is cracked under specific conditions in the CAT-A test. The method of this test is described in "National Petroleum News," vol. 36, page P.R. 537 (August 2, 1944), and the cracking activity so determined is referred to to as the "Activity Index" (A.I.). Accordingly, it will be understood that the term "activity index" when employed herein shall refer to the cracking activity of the material under consideration, determined in accordance with the CAT-A method. Advantageously the catalyst has average pore radii of about 40–70 A. in order to minimize pore diffusional effects which lower the ultimate selectivity of the isomerization reaction products. When in one embodiment of this invention, the desired catalytic characteristics are secured by means hereinafter described, i.e. a treatment in an atmosphere of steam, the catalyst will generally exhibit pore radii of about 55 A. but not greater, usually, than about 65 A. The average pore radii of the material under consideration may conveniently be determined by the ratio of twice the catalyst's pore volume to its inner surface area (BET). The inner surface area may be determined by the so called Brunauer-Emmett-Teller process (BET). See for example, G. M. Schwab, "Handbuch der Katalyse," vol. 4, page 195. Often catalysts having pores of the desired radius will exhibit a total surface area of from about 75–210 or more m.$^2$/g. and usually from about 100–200 m.$^2$/g.

Synthetic gel silica-alumina catalysts represent the preferred class of catalysts because of their regenerability, high rate of conversion obtained and their stability at the operating conditions employed. Silica is usually the major component of the catalyst and the catalyst may contain materials other than alumina. The alumina is usually about 5 to 45% of the catalyst more often about 10 to 30%. The synthetic gel silica-based catalysts are supplied preferably in the form of spheroidal bead like particles. Accordingly, an inorganic oxide gel may be prepared from an inorganic oxide sol which sets to a hydrogel after lapse of a suitable period of time. The resulting hydrogel is thereafter dried to a gel and then heated to an elevated temperature. Usually drops of the hydrosol are introduced into a water-immiscible liquid wherein the hydrosol sets to spheroidal bead-like particles of hydrogel. The spheres are ordinarily within the range of from about $\frac{1}{64}$ to about $\frac{1}{4}$ inch in diameter. The use of these spherically shaped gel particles is of particular advantage in the instant moving bed isomerization process since the particles are subjected to continuous movement.

In the catalyst preparation, the spheroidal bead-like form of hydrogel is generally maintained unchanged from a time prior to gelation until after the gel is dried. During drying, the hydrogel undergoes considerable shrinkage. Drying is carried to a stage beyond that at which maximum shrinkage of the gel is obtained. The gel, after syneresis or shrinkage thereof has been completed, is substantially dry; that is, the gel possesses open pores free of liquid although it still contains a relatively small percentage of water which is evolved upon subjecting the gel to a relatively high activation or calcination temperature. The pores of spheroidal bead-like particles, as stated above, may have an average radius of about 40 to 70 A. While the prepared hydrogel may be dried at ambient temperature by merely exposing it to the air, it is preferred to accelerate the removal of liquid phase from the hydrogel by drying at a temperature in the range of about 150° F. to about 400° F. until shrinkage of the hydrogel is substantially complete. Usually this drying will be performed for a period at least about 6 hours and up to 24 hours or more with a slow stream of air circulated to carry off the water vapor. The beads can be activated by a calcination treatment at a temperature between 500° F. and about 1400° F. usually about 700–1000° F., for instance for a period of between about 2–36 hours. While the calcination or heat treatment will generally be conducted in air, it is also feasible, although generally less desirable, to carry out the same in other oxidizing atmospheres, a reducing atmosphere, such as for example, hydrogen or methane, or an inert atmosphere, such as nitrogen. In some instances it may be desirable to carry out the calcination initially in a blend of air and nitrogen followed by heat treatment in an atmosphere of hydrogen.

A typical silica-alumina hydrosol may be prepared by mixing 1 volume of a solution of sodium silicate containing 157 grams of $SiO_2$ per liter with 1 volume of a solution containing 39.79 grams of aluminum sulfate and 30.51 grams of sulfuric acid per liter. The resulting colloidal solution may then be ejected from a nozzle in the form of globules into a column of gas oil, the depth of which is ordinarily approximately 8 feet. The globules of solution will then fall through the oil and gel before passing into a layer of water located beneath the oil. The time of gelation for the concentrations and proportions of reactants given above will usually be about 4 seconds. The resulting spheroidal particles of hydrogel may then be conducted out of the bottom of the column into a stream of water and on removal from the water, base-exchanged with an aqueous solution of aluminum sulfate and water-washed until free of soluble material. The particles may then slowly and uniformly be dried at about 300° F. until shrinkage of the gel particles is apparently complete. The dried particles can thereafter be calcined at 1300° F.

A commercially available catalytic material representative of those suitable in the practice of this invention is, for instance, a Socony Durabead 38 (activity index) catalyst. The catalyst characteristics desired in this present invention, i.e. an activity index of about 25 to 35, can be conveniently achieved with this commercial catalyst in a variety of ways. For instance, the catalyst may secure to itself the proper activity index through natural aging in the isomerization system in which instance the catalyst make-up rate can be adjusted to maintain the appropriate overall activity level which has been found, according to this invention, to give a notable improvement in the selective isomerization of alkylated aromatic hydrocarbons. Among other commercially available catalytic materials that are also useable in the practice of this invention is a Socony Durabead 42 (activity index) catalyst. Although the desired catalytic characteristics may also be achieved through natural aging when using this catalyst or other high activity catalysts, it has been found that the desired properties may more expeditiously be produced by subjecting the catalyst to a steam pretreatment. The steam treatment may be carried out at a temperature of about 1000–1500° F., preferably about 1200–1300° F., for a period sufficiently long to acomplish the desired results. Ordinarily this will be for about 1–4 hours. Of course one may procure initially a catalyst having the desired activity index.

In the moving bed procedure hot catalyst is continuously circulated as a compact mass through a system having alternate stages of hydrocarbon conversion and catalyst regeneration. In the usual downflow system catalyst introduced into the top of a conversion zone gravitates downwardly through the conversion zone to the bottom of the reactor where it is removed and conducted to a regenerator at a lower level. From the regenerator it may be lifted by bucket or air lift to a separator surge and reintroduced into the conversion system. The catalyst employed in the process can be easily regenerated employing conventional procedures to remove carbon deposited thereon, for instance, by subjecting it to an oxygen-containing gas at temperatures sufficient to burn carbon off the catalyst. This oxygen-containing gas, e.g. an oxygen-nitrogen mixture, often contains about 0.01 to 5 weight percent oxygen, preferably about 0.5 to 1.5 weight percent, and may be introduced at a flow rate such that the maximum temperature at the site of combustion is usually below about 1150 or 1200° F.

Conditions maintained in the practice of the present invention to effect the desired isomerization generally include a temperature sufficient to maintain the aromatic feed in the vapor phase under the pressure employed. This temperature may be from about 600 to 1100° F., preferably from about 800–975° F. The pressure may range from atmospheric up to about 15 or more p.s.i.g. The weight hourly space velocity will in most cases be from about 0.1–8, preferably about 1–3. A catalyst to oil weight ratio may vary from about 0.05–10 and is preferably within the range of about 0.5–3.

The following examples will serve to illustrate the present invention but they are not to be considered limiting.

EXAMPLES I–IV

A regenerated Socony Durabead (42 A.I) silica-alumina catalyst with a CAT-A activity index of 46.3 having an average pore radius of 23 A., and a surface area of 290 m.$^2$/g. was charged to a one inch I.D. moving bed reactor. The catalyst, preheated in Examples I, II, III and IV to 950° F., 900° F., 842° F., and 799° F., respectively, before it entered the reaction zone which was also maintained at these respective temperatures, was introduced into the reaction zone at a rate of 7.9 grams of fresh catalyst per minute. The feed for Examples I and II contained, by weight, 0.5% toluene, 3.5% ethylbenzene, 13.2% paraxylene, 74.2% metaxylene, 7.8% ortho-xylene and 1.0% 1,2,4-trimethylbenzene. The feed for Examples III and IV contained, by weight, 0.5% toluene, 3.1% ethylbenzene, 12.8% para-xylene, 74.4% metaxylene, 8.4% ortho-xylene and 0.8% 1,2,4-trimethylbenzene. These feeds were also preheated to the respective reaction zone temperatures outlined above before their introduction into the reaction zone. The feeds of Examples I, II, III and IV were charged at a rate so that the WHSV was 2.04, 3.40, 3.38 and 3.38, respectively, and the catalyst/oil weight ratio was 1.16 for Examples I and II and 1.17 for Examples III and IV. In all examples the feed and catalyst flowed concurrently through the reaction zone to the outlet where the hydrocarbon was stripped from the catalyst by nitrogen flowing countercurrent to the catalyst and hydrocarbon at the rate of 0.54 cu. ft. per hour. The liquid product was collected and analyzed by infrared and gas chromatography. A representative sample of the catalyst from the reaction zone of each example was analyzed for coke and was found to be, based on the feed by percent, 1.20 to 1.03, 1.08 to 0.93, 0.16 to 0.14 and 0.19 to 0.16 for Examples I to IV respectively. The results of the isomerization reaction are shown in Table I.

Table I

|  | Ex. I | Ex. II | Ex. III | Ex. IV |
|---|---|---|---|---|
| Liquid Product, Wt. percent: |  |  |  |  |
| Benzene | 0.8 | 0.5 | 0.3 | 0.2 |
| Toluene | 9.8 | 6.0 | 3.8 | 2.6 |
| Ethylbenzene | 2.3 | 2.8 | 2.9 | 3.2 |
| p-Xylene | 17.2 | 17.8 | 17.8 | 17.1 |
| m-Xylene | 42.4 | 50.6 | 55.8 | 61.1 |
| o-Xylene | 16.2 | 15.2 | 14.8 | 12.1 |
| Et-Toluene | 0.3 | 0.3 | 0.2 | 0.2 |
| 1,3,5-TMB | 2.6 | 1.6 | 1.0 | 0.8 |
| 1,2,4-TMB | 6.5 | 4.0 | 2.7 | 2.0 |
| 1,2,3-TMB | 1.0 | 0.6 | 0.4 | 0.3 |
| Et-Xylene | 0.2 | 0.2 | 0.1 | 0.3 |
| Total Other $C_{10}$ | 0.6 | 0.5 | 0.1 | 0.1 |
| Total | 99.9 | 100.1 | 99.9 | 100.1 |
| Percent $C_8$ Remaining as $C_8$ | 79.4 | 87.6 | 92.6 | 94.7 |
| Percent p-Xylene in xylenes | 22.7 | 21.3 | 20.2 | 18.9 |
| Percent of Equilibrium—$C_8$ Disproportionation | 35.6 | 21.4 | 12.7 | 9.1 |
| Percent of Equilibrium—$C_8$ Isomerization: |  |  |  |  |
| p-Xylene | 94.7 | 79.6 | 68.0 | 54.5 |
| m-Xylene | 82.6 | 66.0 | 56.6 | 39.2 |
| o-Xylene | 76.0 | 58.5 | 50.0 | 29.3 |

EXAMPLES V–VIII

A Socony Durabead (42 A.I.) silica-alumina catalyst with a CAT-A activity index of 46.3, having an average pore radius of 23 A. and a surface area of 290 m.²/g. was pretreated with steam to produce a catalyst having a CAT-A activity index of about 30.5, a surface area of about 106 m.²/g. and an average pore radius of about 53 A. before charging to a one inch I.D. moving bed reactor. This pretreated catalyst was then heated in Examples V to VIII to 998° F., 954 F., 955° F. and 903° F. respectively, before it entered the reaction zone which was also maintained at these respective temperatures. The rate of entry for each example was the same as that employed in Examples I to IV. The feed for these examples contained, by weight, 0.5% toluene, 3.1% ethylbenzene, 12.8% para-xylene, 74.4% meta-xylene, 8.4% ortho-xylene and 0.8% 1,2,4-trimethylbenzene. The feeds of Examples V to VIII were charged at a rate so that WHSV was 0.92, 0.93, 0.94 and 0.79, respectively, and the catalyst/oil weight ratio was 1.07, 1.06, 1.05 and 1.42, also, respectively. In all examples the feed and catalyst flowed concurrently through the reaction zone to the outlet where the hydrocarbon was stripped from the catalyst by nitrogen flowing countercurrent to the catalyst and hydrocarbon at the rate of 0.54 cu. ft. per hour. The liquid product from each example was collected and analyzed by infrared and gas chromatography. A representative sample of the catalyst from the reaction zone of each example was analyzed for coke which was found to be, based on the feed by percent, 0.47–0.44, 0.23–0.22 and 0.27–0.26 for Examples V to VII respectively. The results of the isomerization reaction are shown in Table II.

Table II

|  | Ex. V | Ex. VI | Ex. VII | Ex. VIII |
|---|---|---|---|---|
| Liquid Product, wt. percent: |  |  |  |  |
| Benzene | 0.5 | 0.3 | 0.3 | 0.4 |
| Toluene | 6.6 | 4.4 | 4.5 | 3.9 |
| Ethylbenzene | 2.4 | 2.7 | 2.8 | 3.1 |
| p-Xylene | 19.1 | 19.7 | 19.6 | 19.7 |
| m-Xylene | 45.9 | 48.9 | 49.5 | 52.5 |
| o-Xylene | 18.4 | 18.6 | 18.1 | 16.0 |
| Et.-Toluene | 0.3 | 0.2 | 0.2 | 0.2 |
| 1,3,5-TMB | 1.5 | 1.2 | 1.1 | 1.0 |
| 1,2,4-TMB | 4.1 | 3.1 | 3.0 | 2.7 |
| 1,2,3-TMB | 0.7 | 0.5 | 0.5 | 0.4 |
| Et-Xylene | 0.2 | 0.2 | 0.2 | 0.1 |
| Total other $C_{10}$ | 0.2 | 0.1 | 0.1 | 0.1 |
| Total | 99.8 | 99.9 | 99.9 | 100.1 |
| Percent $C_8$ remaining as $C_8$ | 87.2 | 91.2 | 91.2 | 92.4 |
| Percent p-Xylene in xylenes | 22.9 | 22.6 | 22.5 | 22.3 |
| Percent of Equilibrium—$C_8$ Disproportionation | 22.2 | 15.2 | 15.0 | 13.5 |
| Percent of Equilibrium—$C_8$ Isomerization: |  |  |  |  |
| p-Xylene | 97.0 | 96.0 | 92.8 | 90.7 |
| m-Xylene | 85.4 | 81.8 | 79.5 | 68.8 |
| o-Xylene | 79.3 | 74.6 | 71.5 | 55.8 |

It can be seen from a comparison of the data in Tables I and II that the process of the instant invention, represented by those examples embodied in Table II, give significant improvement in the catalytic isomerization of xy- Table III
XYLENE ISOMERIZATION-FIXED BED AGING RUN

| Sample No. | IX | X |  | XI |  | XII |  | XIII |  | XIV |  |
|---|---|---|---|---|---|---|---|---|---|---|---|
| Time From the Run-Start Min. | 15 | 60 |  | 165 |  | 315 |  | 375 |  | 555 |  |
| Coke on Catalyst (Wt. Percent) |  |  |  | 3.57 |  |  |  |  |  |  |  |
| Composition of the Liquid Product (Wt. Percent): |  |  |  |  |  |  |  |  |  |  |  |
| Benzene | 0.6 | 0.5 |  | 0.4 |  | 0.3 |  | 0.4 |  | 0.3 |  |
| Toluene | 8.1 | 6.3 |  | 4.7 |  | 3.9 |  | 3.6 |  | 3.0 |  |
| Et. Benzene | 2.6 | 2.9 |  | 3.3 |  | 2.9 |  | 3.2 |  | 3.2 |  |
| p-Xylene | 18.3 | 18.6 | 22.0 | 18.6 | 21.6 | 18.2 | 20.6 | 17.8 | 20.1 | 17.5 | 19.5 |
| m-Xylene | 44.2 | 47.4 | 51.0 | 51.3 | 59.6 | 54.6 | 61.6 | 55.8 | 62.9 | 59.0 | 65.6 |
| o-Xylene | 17.3 | 17.1 | 20.6 | 16.2 | 18.8 | 15.8 | 17.8 | 15.1 | 17.0 | 13.4 | 14.9 |
| Et. Toluene | 0.3 | 0.3 |  | 0.3 |  | 0.2 |  | 0.2 |  | 0.2 |  |
| 1, 3, 5-TMB | 2.0 | 1.6 |  | 1.1 |  | 0.9 |  | 0.9 |  | 0.7 |  |
| 1, 2, 4-TMB | 5.0 | 4.1 |  | 3.0 |  | 2.5 |  | 2.3 |  | 2.1 |  |
| 1, 2, 3-TMB | 0.8 | 0.7 |  | 0.5 |  | 0.4 |  | 0.3 |  | 0.3 |  |
| Et. Xylene | 0.2 | 0.2 |  | 0.2 |  | 0.2 |  | 0.2 |  | 0.1 |  |
| Total $C_{10}$ | 0.5 | 0.4 |  | 0.3 |  | 0.2 |  | 0.1 |  | 0.1 |  |
| Total | 99.9 | 100.0 |  | 99.9 |  | 100.1 |  | 99.9 |  | 99.9 |  |
| Percent $C_8$ converted to disproportionate | 16.3 | 12.8 |  | 9.2 |  | 7.2 |  | 6.6 |  | 5.4 |  |
| Percent of Equilibrium—$C_8$ Disprop. D | 28.0 | 22.1 |  | 15.8 |  | 12.4 |  | 11.4 |  | 9.3 |  |
| Wt. percent non $C_8$ in product | 17.5 | 14.1 |  | 10.5 |  | 8.6 |  | 8.0 |  | 6.8 |  |
| Percent of Equil.—$C_8$ Isomerization: |  |  |  |  |  |  |  |  |  |  |  |
| p-Xylene, Ip | 96.8 | 91.5 |  | 82.9 |  | 72.1 |  | 66.7 |  | 60.2 |  |
| m-Xylene, Im | 82.6 | 78.5 |  | 68.7 |  | 61.3 |  | 56.3 |  | 46.2 |  |
| o-Xylene, Io | 77.6 | 71.5 |  | 61.1 |  | 55.3 |  | 50.7 |  | 38.6 |  |
| Mole percent p-x in $C_8$ Prod. Fraction | 22.2 | 21.6 |  | 20.6 |  | 19.9 |  | 19.4 |  | 18.8 |  |
| I p/D Ratio (percent of Equilibrium) | 3.5 | 4.1 |  | 5.2 |  | 5.8 |  | 5.9 |  | 6.5 |  |
| I p/Io | 1.25 | 1.28 |  | 1.36 |  | 1.30 |  | 1.32 |  | 1.56 |  | lene when in the process an isomerization catalyst having a catalyst activity index of about 25–35 and an average pore radius of about 40–70 A. is employed in a moving bed procedure.

In contradistinction to the concepts of this invention, an isomerization reaction was performed by charging to the reactor, which was a fixed catalyst bed isomerization unit operated at 950° F. at atmospheric pressure and at a WHSV of about 2, an ethylbenzene lean meta-xylene concentrate feed. The feed contained by weight 0.5% toluene, 3.5% ethylbenzene, 13.2% para-xylene, 74.2% meta-xylene, 7.8% ortho-xylene and 1.0% 1,2,4-trimethylbenzene.

The catalyst, a Socony Durabead (42 A.I.) silica-alumina composite (12% $Al_2O_3$), had a CAT-A activity index of 46.3, a surface area of about 290 m.$^2$/g. and an average pore radii of about 23 A. This fixed bed unit was operated over a 12-hour period. As can be seen from the results of this operation set forth in Table III, xylene isomerization activity falls from 96.8% to 66.7% in less than 7 hours. This represents approximately a 30 percent loss in para-xylene recovery per pass of isomerizate to a crystallizer.

The method of this invention may advantageously be employed in combination with other hydrocarbon conversion processes such as for example transalkylation-isomerization moving bed procedures. In such instances, a transalkylation zone may be provided for processing methyl benzenes boiling higher and lower than the methyl benzene feed to the isomerization zone. The transalkylation products may then be introduced into the isomerizer and traverse this unit in accordance with the methods outlined above. Any higher or lower boiling hydrocarbons formed in this isomerization process may be isolated from the desired product and its isomers and the wanted isomer may be isolated in relatively pure form as by crystallization. The crystallization mother liquor may advantageously be utilized as a source of feedstock to the isomerization zone while the higher and lower boiling hydrocarbons may be recycled to the transalkylation zone.

It is claimed:
1. The process for the catalytic isomerization of a methyl benzene of 8 to 10 carbon atoms which comprises contacting the methyl benzene with a moving bed of silica-alumina bead isomerization catalyst having a diameter of about $1/16$ to $3/8$ inch, a catalyst activity index of about 25–35 and an average pore radius of about 40–70 A., at a temperature in the range of about 600 to 1100° F. to produce isomerized methyl benzene, said isomerization being conducted in the absence of added hydrogen.

2. The process of claim 1 wherein the methyl benzene feedstock is xylene.

3. The process of claim 2 wherein the methyl benzene feedstock contains about 55 to 85% meta-xylene.

4. The process of claim 2 wherein the catalyst has a catalyst activity index of about 25 to 30.

5. The process of claim 1 wherein the catalyst is silica-alumina which has been steam-treated at a temperature of about 1000 to 1500° F.

References Cited by the Examiner
UNITED STATES PATENTS

| | | | |
|---|---|---|---|
| 2,403,757 | 7/46 | Reeves | 260—668 |
| 2,656,397 | 10/53 | Holzman et al. | 260—668 |
| 2,775,628 | 12/56 | Nicholson et al. | 260—668 |
| 2,837,582 | 6/58 | Hill et al. | 260—668 |
| 2,874,200 | 2/59 | Sanford | 260—668 |

ALPHONSO D. SULLIVAN, *Primary Examiner.*

PAUL M. COUGHLAN JR., *Examiner.*

UNITED STATES PATENT OFFICE
CERTIFICATE OF CORRECTION

Patent No. 3,214,485                         October 26, 1965

Emmett H. Burk, Jr., et al.

It is hereby certified that error appears in the above numbered patent requiring correction and that the said Letters Patent should read as corrected below.

Column 1, line 15, after "selected" insert -- catalyst --; line 35, for "more" read -- none --; column 2, line 22, strike out "to", first occurrence.

Signed and sealed this 7th day of June 1966.

(SEAL)
Attest:

ERNEST W. SWIDER                         EDWARD J. BRENNER
Attesting Officer                          Commissioner of Patents